US012199384B2

(12) United States Patent
Chen

(10) Patent No.: US 12,199,384 B2
(45) Date of Patent: Jan. 14, 2025

(54) ELECTRICAL CONNECTOR

(71) Applicant: PEGATRON CORPORATION, Taipei (TW)

(72) Inventor: Chien-Chung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 365 days.

(21) Appl. No.: 17/901,529

(22) Filed: Sep. 1, 2022

(65) Prior Publication Data

US 2023/0122865 A1 Apr. 20, 2023

(30) Foreign Application Priority Data

Oct. 19, 2021 (TW) ................................ 110138749

(51) Int. Cl.
*H01R 13/6591* (2011.01)
*H01R 13/6583* (2011.01)

(52) U.S. Cl.
CPC ................................ *H01R 13/6591* (2013.01)

(58) Field of Classification Search
CPC ............ H01R 13/6485; H01R 13/6583; H01R 13/6591
See application file for complete search history.

(56) References Cited

U.S. PATENT DOCUMENTS 6,313,985 B1 * 11/2001 Chen ....................... G06F 1/184 361/741
6,396,686 B1 5/2002 Liu et al.
11,431,133 B2 * 8/2022 Tang .................. H01R 13/6594
11,784,434 B2 * 10/2023 Yang ....................... F16B 2/185 439/607.23
2013/0224998 A1 * 8/2013 Feldstein ........... H01R 13/6596 439/607.01
2015/0200493 A1 * 7/2015 Gao ................... H01R 13/6582 439/607.28
2017/0294745 A1 * 10/2017 Nozawa ............. H01R 13/6591
2019/0334290 A1 * 10/2019 Droesbeke ........... H01R 13/629
2022/0344841 A1 * 10/2022 Huang ................. H01R 9/2416

FOREIGN PATENT DOCUMENTS

CN 208126381 U * 11/2018 ............. G06F 13/40
WO WO-2015180182 A1 * 12/2015 ........... H01R 13/187

* cited by examiner

*Primary Examiner* — Abdullah A Riyami
*Assistant Examiner* — Thang H Nguyen
(74) *Attorney, Agent, or Firm* — MUNCY, GEISSLER, OLDS & LOWE,P.C.

(57) ABSTRACT

The present disclosure discloses an electrical connector, including a connector body and an adjustable elastic piece assembly. The connector body includes a mounting surface. The adjustable elastic piece assembly includes a fixing plate and a grounding elastic piece. The fixing plate is arranged on the mounting surface of the connector body. The fixing plate includes a guide rail extending along a first direction. The guide rail has a plurality of limiting grooves, and the limiting grooves are arranged at intervals. The grounding elastic piece is arranged on the fixing plate along the first direction. The grounding elastic piece includes a fixed end and a movable end that are opposite to each other. The fixed end is fixed to the fixing plate. The movable end is slidably arranged in the guide rail, and is adapted to be positioned in one of the limiting grooves.

10 Claims, 3 Drawing Sheets

ELECTRICAL CONNECTOR

TECHNICAL FIELD

The present disclosure relates to a connector, and in particular, to an electrical connector.

BACKGROUND

Currently, there are various types of electrical connectors with signal ports, such as USB Type-A and USB Type-C connectors and SD card connectors, which are becoming increasingly popular on the market. A part of the electrical connector is cut into an elastic piece, to overlap a housing of an electronic device, thereby generating an electromagnetic interference (EMI) barrier, to avoid a problem of signal interference.

However, currently, the height of the elastic piece of the electrical connector is fixed. As a result of insufficient height for the elastic piece to overlap the housing of the electronic device, it is currently only possible to add an accessory (such as a gasket) or replace the electrical connector with an electrical connector having an elastic piece with a different height.

SUMMARY

In view of the foregoing subject, a main objective of the present disclosure is to provide an electrical connector having a novel structure of an adjustable elastic piece assembly, to resolve the problem that the height of the elastic piece of the conventional electrical connector cannot be adjusted.

To achieve the foregoing objective, the present disclosure provides an electrical connector, including a connector body and an adjustable elastic piece assembly. The connector body includes a mounting surface. The adjustable elastic piece assembly includes a fixing plate and a grounding elastic piece. The fixing plate is arranged on the mounting surface of the connector body. The fixing plate includes a guide rail extending along a first direction. The guide rail has a plurality of limiting grooves, and the limiting grooves are arranged at intervals. The grounding elastic piece is arranged on a side surface of the fixing plate opposite to the mounting surface along the first direction. The grounding elastic piece includes a fixed end and a movable end that are opposite to each other. The fixed end is fixed to a side of the fixing plate. The movable end is slidably arranged in the guide rail, and is adapted to be positioned in one of the limiting grooves.

Based on the above, a height of the grounding elastic piece relative to the connector body can be adjusted by changing the position of the movable end of the grounding elastic piece in different limiting grooves, so that the electrical connector can be applied to different electronic devices.

DETAILED DESCRIPTION

Figure 1:
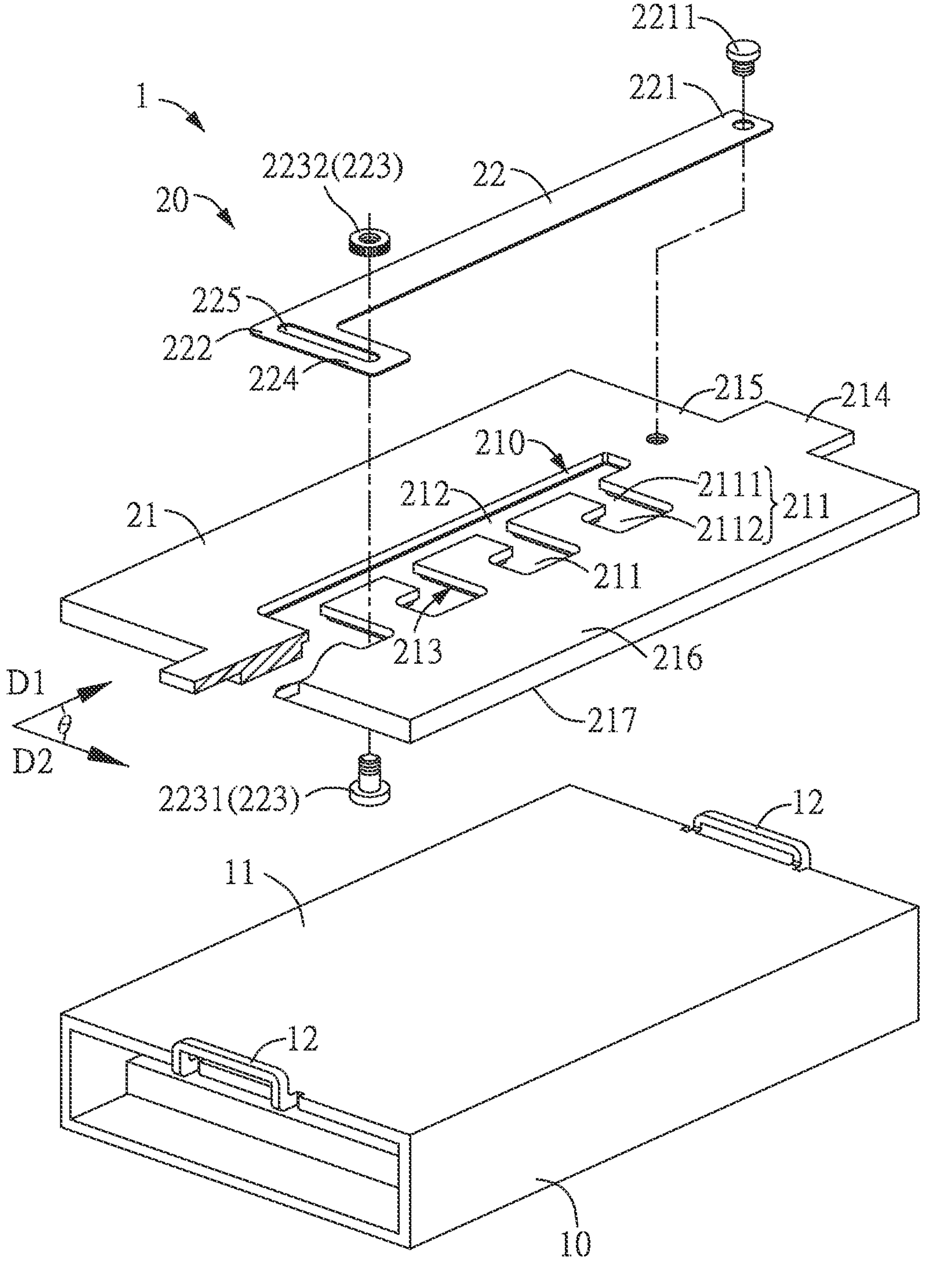
FIG. 1 is a schematic exploded view of an electrical connector according to an embodiment of the present disclosure.

To understand the technical content of the present disclosure better, descriptions of specific preferred embodiment are provided below particularly. The following further describes specific implementations of the present disclosure with reference to the drawings and the embodiments. The following embodiments are merely used for more clearly describing the technical solutions of the present disclosure, and are not intended to limit the protection scope of the present disclosure.

In descriptions of the embodiments, terms such as "first" and "second" are used for describing different elements, and the elements are not limited by such terms. In addition, for convenience and clarity of the description, thicknesses or sizes of the elements in the drawings expressed in an exaggerated, omitted or general manner are used to help a person skilled in the art to understand and read, and the sizes of elements are not completely actual sizes and are not intended to limit restraint conditions under which the present disclosure can be implemented and therefore have no technical significance. Any modification to the structure, change to the proportional relationship or adjustment on the size should fall within the scope of the technical content disclosed by the present disclosure without affecting the effects and the objectives that can be achieved by the present disclosure. The same reference numerals are used to indicate the same or similar elements in all of the drawings.

Figure 2:
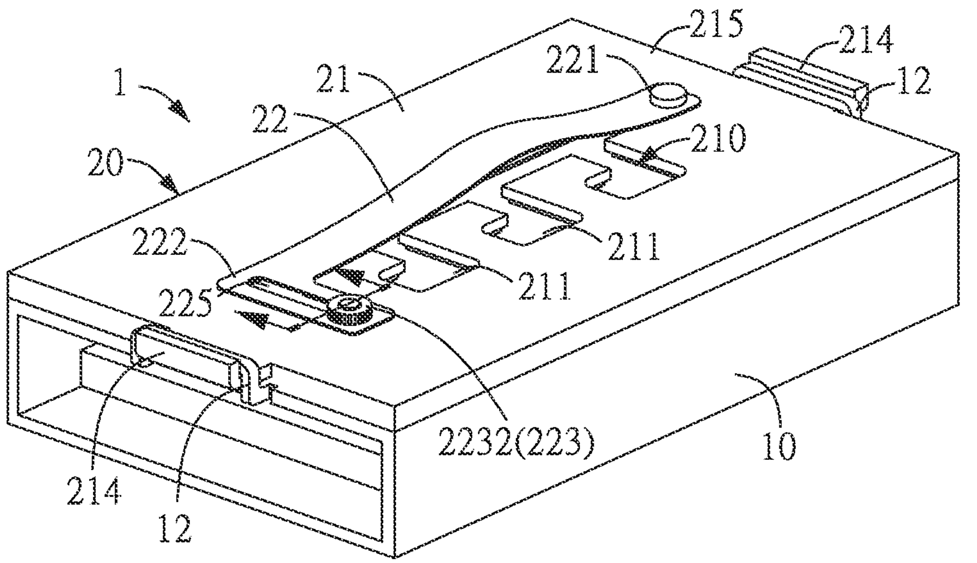
FIG. 2 is a schematic assembled view of the electrical connector shown in FIG. 1.

FIG. 1 is a schematic exploded view of an electrical connector according to an embodiment of the present disclosure. FIG. 2 is a schematic assembled view of the electrical connector shown in FIG. 1. Referring to FIG. 1 and FIG. 2, first, an electrical connector 1 of this embodiment may be applied to an electronic device, and overlap a housing of the electronic device. In this embodiment, the electrical connector 1 includes a connector body 10 and an adjustable elastic piece assembly 20. The connector body 10 may be, for example, but is not limited to, an electrical connector having a USB Type-A connector, a USB Type-C connector, or an SD card connector. The connector body 10 includes a mounting surface 11. When the connector body 10 is assembled into the electronic device, the mounting surface 11 is located on an opposite side of an assembly surface. Using FIG. 1 as an example, the mounting surface 11 is an upper side surface of the connector body 10, and the adjustable elastic piece assembly 20 is arranged on the mounting surface 11.

Referring to FIG. 1, the adjustable elastic piece assembly 20 includes a fixing plate 21 and a grounding elastic piece 22. The fixing plate 21 is arranged on the mounting surface 11 of the connector body 10. The grounding elastic piece 22 is arranged on a side surface of the fixing plate 21 opposite to the mounting surface 11. The fixing plate 21 includes a guide rail 210, and the guide rail 210 extends along a first direction D1. The first direction D1 may be a long-axis direction of the connector body 10. In addition, the guide rail 210 has a plurality of limiting grooves 211, and the limiting grooves 211 are arranged at intervals. In other words, the limiting grooves 211 are respectively located at different positions in the first direction D1.

The grounding elastic piece 22 includes a fixed end 221 and a movable end 222 that are opposite to each other. The fixed end 221 is fixed to the fixing plate 21, and is close to a side 215 of the fixing plate 21. For example, the fixed end 221 is fixed to the fixing plate 21 by a screw 2211, or in a bonding manner. The movable end 222 is slidably arranged in the guide rail 210, and is adapted to be positioned in one of the limiting grooves 211.

Figure 3:
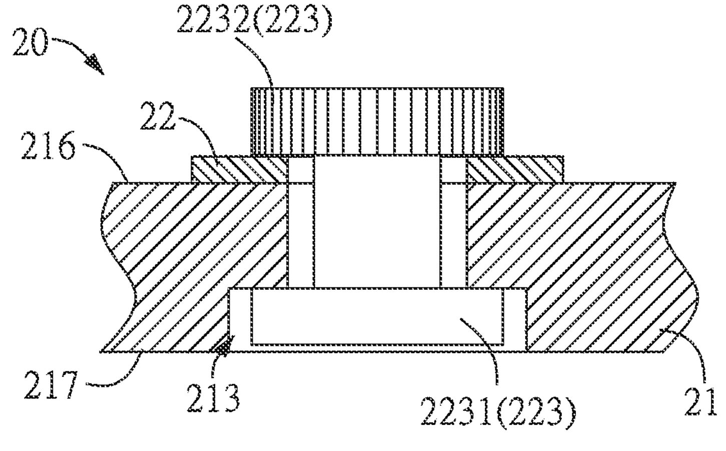
FIG. 3 is a schematic cross-sectional view of the electrical connector shown in FIG. 2 at a clamping structure.

FIG. 3 is a schematic cross-sectional view of the electrical connector shown in FIG. 2 at a clamping structure. Referring to FIG. 1, FIG. 2, and FIG. 3, in this embodiment, the grounding elastic piece 22 further includes a clamping structure 223 located at the movable end 222, and the guide rail 210 includes a bottom sliding groove 213 located on a side opposite to the grounding elastic piece 22. The clamping structure 223 has a lower protruding portion 2231, and the lower protruding portion 2231 is slidably accommodated in the bottom sliding groove 213, so that the clamping structure 223 can be moved along the guide rail 210 without falling off. In addition, because the guide rail 210 of this embodiment is a structure penetrating through the fixing plate 21, the clamping structure 223 may preferably have an upper protruding portion 2232. A bottom surface of the upper protruding portion 2232 is in contact with an upper surface 216 of the fixing plate 21, to prevent the clamping structure 223 from falling off from the bottom of the fixing plate 21.

In this embodiment, the clamping structure 223 may be a combination of a screw and a nut, that is, the lower protruding portion 2231 may be a screw, and the upper protruding portion 2232 may be a nut. Specifically, after the screw penetrates through the guide rail 210 from a lower surface 217 of the fixing plate 21, the nut is locked with the screw on the upper surface 216 of the fixing plate 21, to form the clamping structure 223 of this embodiment.

The structure of the limiting grooves 211 is not particularly limited in the present disclosure, and only needs to be a structure that can limit the displacement of the clamping structure 223. Preferably, as shown in FIG. 1, the guide rail 210 of this embodiment further includes a primary rail 212 parallel to the first direction D1, and the limiting grooves 211 extend from the primary rail 212 along a second direction D2. The first direction D1 and the second direction D2 are not parallel, so that there may be an angle θ between the first direction D1 and the second direction D2.

In this embodiment, the angle θ is 90 degrees, and each of the limiting grooves 211 includes a first part 2111 and a second part 2112 that are connected in a bent manner, and the angle θ is formed between the first part 2111 and the first direction D1. Specifically, with the first part 2111 and the second part 2112 connected in a bent manner, the movable end 222 of the grounding elastic piece 22 can be limited in the second part 2112. Preferably, the limiting groove 211 is L-shaped, so that the second part 2112 of the limiting groove 211 is parallel to the first direction D1 and parallel to the primary rail 212.

In addition, the grounding elastic piece 22 of this embodiment further has an extension portion 224 located at the movable end 222, to fit with the L-shaped limiting groove 211. Specifically, the extension portion 224 is parallel to the second direction D2. In addition, the grounding elastic piece 22 includes a guide hole 225 arranged at the extension portion 224. A long axis of the guide hole 225 is parallel to the second direction D2, and the clamping structure 223 movably penetrates through the guide hole 225 and the guide rail 210 in sequence, so that the clamping structure 223 can be moved left and right in the guide hole 225.

Figure 4:
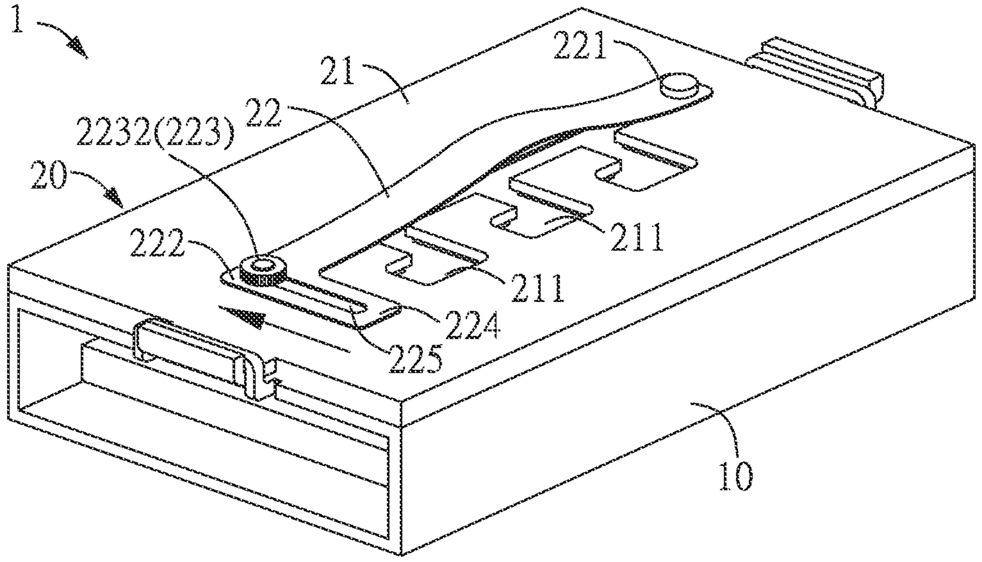
FIG. 4 and FIG. 5 are schematic action views of a clamping structure of a grounding elastic piece shown in FIG. 2.
Figure 5:
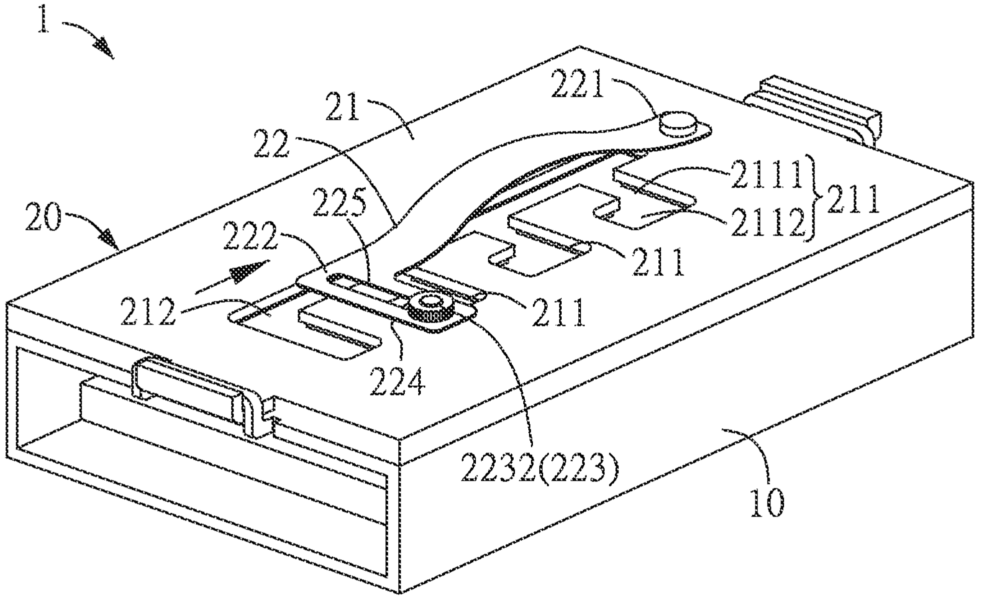

FIG. 4 and FIG. 5 are schematic action views of a clamping structure of a grounding elastic piece shown in FIG. 2. When a height of the grounding elastic piece 22 needs to be adjusted, as shown in FIG. 4, the clamping structure 223 is first moved left along the guide hole 225 (as an arrow symbol shown in FIG. 4), in order to move the clamping structure 223 to the primary rail 212. Next, as shown in FIG. 5, the clamping structure 223 is moved along the primary rail 212 (as an arrow symbol shown in FIG. 5), and when being moved to one of the limiting grooves 211, the clamping structure 223 can be limited by the limiting groove 211 and arranged in the limiting groove 211. Specifically, after being close to an appropriate limiting groove 211, the clamping structure 223 is first moved right to the first part 2111 of the limiting groove 211, and then the entire extension portion 224 is moved down, to move the clamping structure 223 to the second part 2112 of the limiting groove 211. With the structure of which the first part 2111 and the second part 2112 are connected in a bent manner, the clamping structure 223 can be limited in the second part 2112, to fix an adjusted height of the grounding elastic piece 22. In this embodiment, before the clamping structure 223 is moved (that is, when the clamping structure 223 is located at an initial position), a distance between any limiting groove 211 and the fixed end 221 is less than a distance between the movable end 222 and the fixed end 221. Therefore, when the clamping structure 223 at the movable end 222 is moved toward the fixed end 221 to the limiting groove 211, the grounding elastic piece 22 is bent and has a height, that is, the bent part of the grounding elastic piece 22 is at the height from the connector body 10. When the electrical connector 1 is assembled into the electronic device, the adjustable elastic piece assembly 20 faces the housing of the electronic device (namely, a structure to be overlapped), so that the bent part of the grounding elastic piece 22 can overlap the housing of the electronic device, thereby generating an electromagnetic interference (EMI) barrier, to avoid a problem of signal interference.

The plurality of limiting grooves 211 of this embodiment is arranged in the guide rail 210 at intervals, so that distances between the limiting grooves 211 and the fixed end 221 are different. Therefore, the clamping structure 223 may be arranged in different limiting grooves 211, so that the grounding elastic piece 22 has different heights. For example, when the clamping structure 223 is arranged in the limiting groove 211 closest to the fixed end 221, the grounding elastic piece 22 has a highest height, that is, the bent part of the grounding elastic piece 22 is farthest away from the connector body 10. In other words, the height of the grounding elastic piece 22 can be adjusted by adjusting an arranged position (being in different limiting grooves 211) of the clamping structure 223, so that the electrical connector 1 of this embodiment can be applied to different electronic devices.

In other embodiments, the angle θ may be less than 90 degrees. When the clamping structure 223 is moved to the limiting groove 211, with the structure of which the angle θ is less than 90 degrees, the clamping structure 223 can be limited in the limiting groove 211, to fix the adjusted height of the grounding elastic piece 22.

As shown in FIG. 1 and FIG. 2, in this embodiment, the connector body 10 further includes at least one first connection portion 12, and the fixing plate 21 has at least one second connection portion 214. The second connection portion 214 is engaged with the first connection portion 12. For example, the connector body 10 may have two first connection portions 12, and the first connection portions 12 may be through slots or inserting slots, and are located on two opposite short sides of the connector body 10. Correspondingly, the fixing plate 21 has two second connection portions 214 respectively extending from the two opposite short sides of the fixing plate 21, so that the second connection portions 214 (protruding portions) can be inserted into and engaged with the first connection portions 12 (the through slots or inserting slots), so that the adjustable elastic piece assembly 20 is arranged on the connector body 10, to form the electrical connector 1 of this embodiment. Preferably, after the second connection portion 214 (a protruding portion) of this embodiment is inserted into the first connection portion 12 (a through slot or an inserting slot), the second connection portion 214 (the protruding portion) may be folded again, to fix the fixing plate 21 to the connector body 10.

In other embodiments, the fixing plate 21 may be integrally formed on the mounting surface 11 of the connector body 10. In other words, the connector body 10 and the fixed board 21 and the guide rail 210 are integrally formed, and the grounding elastic piece 22 is additionally assembled onto the fixing plate 21, which is not limited in the present disclosure.

In summary, the electrical connector according to the present disclosure includes a connector body and an adjustable elastic piece assembly. The adjustable elastic piece assembly includes a fixing plate and a grounding elastic piece. The fixing plate includes a guide rail, and is arranged on the connector body. The guide rail has a plurality of limiting grooves arranged at intervals. The grounding elastic piece is arranged on the fixing plate. One end of the grounding elastic piece is a fixed end fixed to the fixing plate, and the other end is a movable end. The movable end is slidably arranged in the guide rail, and is adapted to be positioned in one of the limiting grooves, so that the grounding elastic piece can have different heights. Therefore, a height of the grounding elastic piece relative to the connector body can be changed by adjusting the limiting groove in which the movable end of the grounding elastic piece is positioned, so that the electrical connector can be applied to different electronic devices.

It should be noted that the above embodiments are merely examples for description, and the scope of rights claimed in the present disclosure should be subject to the scope of the patent application, rather than being limited to the above embodiments.

What is claimed is:

1. An electrical connector, comprising:

a connector body, comprising a mounting surface; and an adjustable elastic piece assembly, comprising:

a fixing plate, arranged on the mounting surface of the connector body, and comprising a guide rail extending along a first direction, wherein the guide rail comprises a plurality of limiting grooves, and the limiting grooves are arranged at intervals; and a grounding elastic piece, arranged on a side surface of the fixing plate opposite to the mounting surface along the first direction, wherein the grounding elastic piece comprises a fixed end and a movable end opposite to each other, the fixed end is fixed to the fixing plate, and the movable end is slidably arranged in the guide rail, and is adapted to be positioned in one of the limiting grooves.

2. The electrical connector according to claim 1, wherein the guide rail comprises a primary rail parallel to the first direction, the limiting grooves extend from the primary rail along a second direction, and an angle is formed between the first direction and the second direction.

3. The electrical connector according to claim 2, wherein each of the limiting grooves comprises a first part and a second part connected in a bent manner, the angle is formed between the first part and the first direction, and the movable end of the grounding elastic piece is limited in the second part.

4. The electrical connector according to claim 3, wherein the second part of each of the limiting grooves is parallel to the first direction.

5. The electrical connector according to claim 2, wherein the grounding elastic piece has an extension portion, the extension portion is arranged at the movable end, and the extension portion is parallel to the second direction.

6. The electrical connector according to claim 5, wherein the grounding elastic piece comprises a guide hole and a clamping structure, the guide hole is arranged at the extension portion, a long axis of the guide hole is parallel to the second direction, and the clamping structure movably penetrates through the guide hole and the guide rail in sequence.

7. The electrical connector according to claim 6, wherein the guide rail comprises a bottom sliding groove located on a side opposite to the grounding elastic piece, the clamping structure has a lower protruding portion, and the lower protruding portion is slidably accommodated in the bottom sliding groove.

8. The electrical connector according to claim 1, wherein the connector body further comprises at least one first connection portion, the fixing plate has at least one second connection portion, and the at least one second connection portion is engaged with the at least one first connection portion.

9. The electrical connector according to claim 8, wherein the first connection portion is a through slot, the second connection portion is a protruding portion, and the second connection portion is inserted into the first connection portion, so that the adjustable elastic piece assembly is arranged on the connector body.

10. The electrical connector according to claim 1, wherein the fixing plate is integrally formed on the mounting surface of the connector body.

* * * * *